United States Patent [19]

McKinnon

[11] 4,453,749

[45] Jun. 12, 1984

[54] CUT OFF NIPPLES

[76] Inventor: Robert M. McKinnon, P.O. Box 648, Bedford, Tex. 76021

[21] Appl. No.: 388,102

[22] Filed: Jun. 14, 1982

[51] Int. Cl.³ .................. F16L 35/00; F16L 15/00; F16L 25/00
[52] U.S. Cl. .................. 285/4; 285/390; 285/423
[58] Field of Search .................. 285/3, 4, 355, 390, 285/333, 334, 423

[56] References Cited

U.S. PATENT DOCUMENTS 3,480,299 11/1969 Henderson .................. 285/4

Primary Examiner—Richard J. Scanlan, Jr.
Attorney, Agent, or Firm—Wofford, Fails & Zobal

[57] ABSTRACT

A hollow cylindrical member having a plurality of sets of threads formed on its exterior such that the member may be used as a nipple of one length or severed at different positions to form up to three useful nipples of lesser lengths.

9 Claims, 6 Drawing Figures

CUT OFF NIPPLES

BACKGROUND OF THE INVENTION

In forming irrigation systems for lawns, shrubbery, trees, etc., PVC pipe is located underground and plastic nipples are screwed to the pipe to extend upward. Sprinkler heads are screwed to the upper ends of the nipples. The lengths of the nipples used depend on the depth of the pipe.

One plastic nipple now on the market comprises a hollow cylindrical member having a set of exterior threads formed at one end and a plurality of spaced apart sets of exterior threads formed from the other end. The member may be severed between the plurality of sets of threads to form a nipple of lesser length if needed. The unused portion of the severed member is of no value and is thrown away. Such a nipple is useful, however, it results in a waste of material when the nipple is severed to form a smaller nipple.

SUMMARY OF THE INVENTION

It is an object of the present invention to provide a nipple which may be severed at different positions to form a plurality of useful nipples of lesser length.

The nipple comprises a hollow cylindrical shaped member having a set of exterior threads formed at one end. A plurality of spaced apart sets of exterior threads are formed from the other end such that the member may be severed between the plurality of spaced apart sets of threads to form two or more useful nipples.

DESCRIPTION OF THE PREFERRED EMBODIMENT

Figure 1:
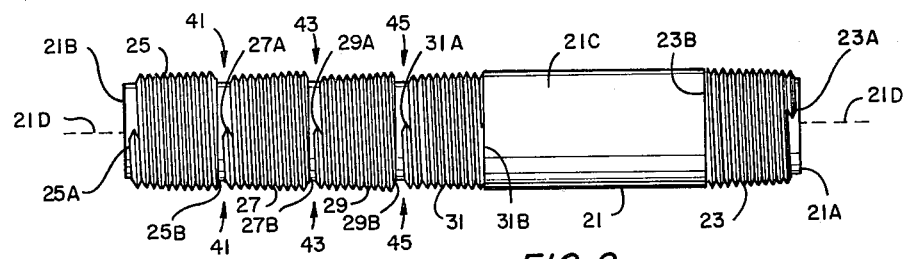
FIG. 1 is a side view of a prior art nipple.

Referring now to FIG. 1 there will be described a prior art nipple used in the installation of irrigation systems. It comprises a hollow cylindrical member 21 formed of a suitable plastic material. A set of exterior threads 23 are formed at one end 21A and a plurality of spaced apart sets of exterior threads 25, 27, 29, and 31 are formed at positions spaced from threads 23. Threads 25 are formed at end 21B and threads 27, 29, and 31 are formed at positions progressively closer to threads 23. No threads are formed on portion 21C. Threads 23, 25, 27, 29, and 31 have start portions 23A. 25A, 27A, 29A and 31A respectively. When viewed from end 21A, threads 23, from start portion 23A, wind clockwise around the member 21 to edge 23B which is in a plane perpendicular to the axis 21D of the member 21. When viewed from end 21B, threads 25, 27, 29, and 31 from their start portions 25A, 27A, 29A, and 31A wind clockwise around the member 21 to edges 25B, 27B, 29B and 31B respectively which are in planes perpendicular to the axis 21D of the member 21. The diameters of threads 23, 25, 27, 29, and 31 taper from edges 23B, 25B, 27B, 29B and 31B to their start portions 23A, 25A, 27A, 29A and 31A respectively whereby the diameters of threads 23, 25, 27, 29, and 31 at their start portions 23A, 25A, 27A, 29A, and 31A are less than the diameters of threads 23, 25, 27, 29, and 31 at their edges 23B, 25B, 27B, and 29B, and 31B respectively.

The member 21 has a length of about six inches and can be employed as a six inch nipple using threads 23 and 25. If a five inch, four inch or three inch nipple is needed, member 21 can be severed along planes 41, 43 or 45 respectively. The severed portion of the member to the left of planes 41, 43, or 45 is thrown away.

The nipple of FIG. 1 is useful, however, it results in wasted material when it is cut to form a smaller nipple. The unused portion cannot be used as a nipple since the planer end or edge portions 25B, 27B and 29B and the direction of taper of the diameters of threads 25, 27, and 29 will prevent threads 25, 27, or 29 from being effectively screwed from ends 25B, 27B, and 29B into conventional tapered female threads of a coupling or pipe. If the ends 25B, 27B, or 29B are forced into a coupling or pipe having conventional tapered female threads, cross-threading and hence leakage will result. If one inch or two inch nipples are needed they must be carried separately which results in an increase in inventory.

DESCRIPTION OF THE PREFERRED EMBODIMENT

Figure 2:
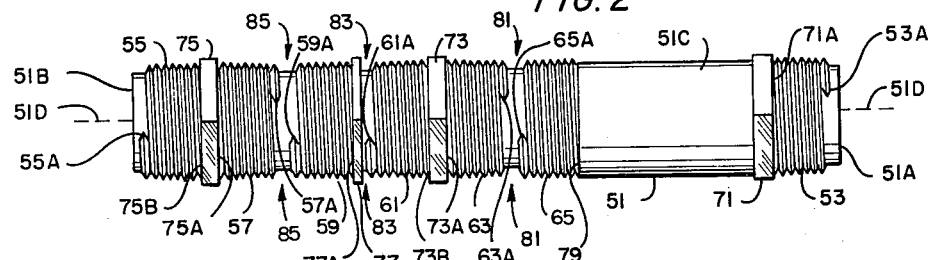
FIG. 2 is a side view of the nipple of the present invention.
Figure 6:
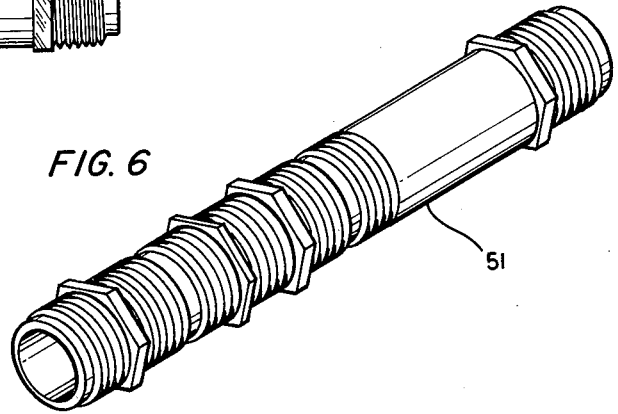
FIG. 6 is a perspective view of the nipple of FIG. 2.

Referring now to FIGS. 2 and 6, there will be described the nipple of the present invention. It comprises a hollow cylindrical member 51 formed of a suitable plastic material such as polyethelene. A set of exterior threads 53 are formed at one end 51A and a plurality of spaced apart sets of exterior threads 55, 57, 59, 61, 63, and 65 are formed at positions spaced from threads 53. Threads 55 are formed at end 51B and threads 57, 59, 61, 63, and 65 are formed at positions progressively closer to threads 53. No threads are formed on portion 51C. Threads 53, 55, 57, 59, 61, 63, and 65 have start portions 53A, 55A, 57A, 59A, 61A, 63A, and 65A respectively. When viewed from end 51A, threads 53, 63, and 57, from their start portions 53A, 63A, and 57A, wind clockwise around the member 51 to edges or sides 71A, 73A, and 75A respectively of flange structures 71, 73, and 75 where the other ends of threads 53, 63, and 57 terminate. Flange structures 71, 73 and 75 extend 360° around member 51 and form hexagon shaped wrench flats around which a wrench may be placed for tightening purposes. Sides 71A, 73A, and 75A are in planes perpendicular to the axis 51D of the member 51. When viewed from end 51B, threads 55, 59, and 61, from their start portions 55A, 59A, and 61A, wind clockwise around the member 51 to edges or sides 75B, 77A, and 73B respectively of flange structures 75, 77, and 73 where the other ends of threads 55, 59, and 61 terminate. Flange structure 77 extends 360° around member 51 and forms hexagon shaped wrench flats around which a wrench may be placed for tightening purposes. When viewed from end 51B, threads 65, from their start portion 65A, wind clockwise around the member 51 to edge 79 where the other ends of threads 65 terminate. Edge 79 extends 360° around member 51. Edges or sides 75B, 77A, 73B, and 79 are in planes perpendicular to the axis 51D of the member 51. The diameters of threads 53, 57, and 63 taper from their ends at sides 71A, 75A, and 73A to their start portions 53A, 57A, and 63A respectively whereby the diameters of the threads 53, 57, and 63 at their start portions 53A, 57A, and 63A are less than the diameters of the threads 53, 57, and 63 at their ends at sides 71A, 75A, and 73A respectively. The diameters of threads 55, 59, 61, and 65 taper from their ends at sides or edges 75B, 77A, 73B, and 79 to their start portions 55A, 59A, 61A, and 65A respectively whereby the diameters of the threads 55, 59, 61, and 65 at their start portions 55A, 59A, 61A, and 65A are less than the diameters of the threads 55, 59, 61, and 65, at their ends at sides or edges 75B, 77A, 73B, and 79 respectively. Reference is made to *Machinery's Handbook,* by Erik Oberg, Franklin D. Jones and Holbrook L. Horton, Twentieth Edition, Third Printing, 1976, Industrial Press, Inc., 200 Madison Ave., New York, N.Y. 10016, pages 1397–1403 for a description of taper pipe threads.

Figure 3:
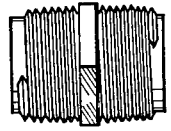
FIGS. 3–5 are side views of different size nipples formed from the nipple of FIG. 2.
Figure 4:
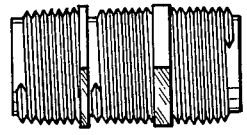
Figure 5:
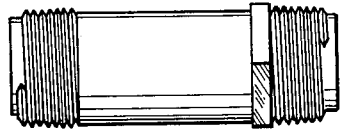

The member 51 has a length of about six inches and can be employed as a six inch nipple using threads 53 and 55. A plurality of useful nipples of lesser length can be formed be severing along planes 81, 83, 85. If the member 51 is severed along plane 81, essentially two, three inch nipples are formed. If the member 51 is severed along plane 85 a one inch and a five inch nipple are formed. If the member 51 is severed along planes 81, and 85, a one inch, a two inch, and a three inch nipple are formed as shown in FIGS. 3, 4, and 5 respectively. A four inch and a one inch nipple may be formed by severing along planes 83 and 85. In this case, the portion of member 51 between planes 83 and 85 is thrown away. Due to the manner in which the threads 53 55, 57, 59, 61, 63, and 65 are formed on member 51 as described above, both ends of the resulting nipples of lesser length formed, by severing member 51 as described above, can be effectively screwed into conventional tapered female threads of coupling members or of pipe.

Thus as can be understood, the nipples of the present invention allows one to obtain a plurality of effective and useful nipples of lesser length with little or no waste of material since no part of the member 51 need be thrown away unless the nipple is severed along planes 83 and 85 to form a one inch and a four inch nipple. The nipple 51 can be severed on the job with a pocket knife if nipples of lesser length are needed. The nipple 51 results in a reduction in inventory and a reduction in contractor down time.

When the nipple 51 or resulting nipples of lesser length formed are used, the nipples preferably are screwed into the threads of PVC pipe such that flanges 71, 73, or 75 will be next to the PVC pipe. The nipple 51 preferably is formed by injection molding. In one embodiment, the threads per inch of each set of threads are 14 threads per inch and are American National Standard Taper Pipe Threads. In this embodiment, the nipple 51 is formed in two sizes, one size having outside thread diameters of ¾ of an inch, and the other size having outside thread diameters of ½ of an inch.

Although the nipple 51 was described as being a six inch nipple which may be severed to form up to three effective and useful nipples of lesser length, it is to be understood that the invention may be employed in nipples of other lengths. For example, the nipple may be a four inch nipple employing only threads 53, 61, 63, and 65 and which may be severed along plane 81 to form a one inch nipple and a three inch nipple.

I claim:

1. A nipple device, comprising:
a hollow cylindrical shaped member having first and second ends,
a first set of threads formed on the exterior of said member at said first end,
said first set of threads having a start portion at said first end and an end portion spaced from said start portion,
said first set of threads from its start portion winding around said member in a first direction when viewed from said first end,
the diameter of said first set of threads tapering from its end portion to its start portion,
a second set of threads formed on the exterior of said member at a position spaced from said first set of threads,
said second set of threads having a start portion and an end portion spaced from said start portion,
said end portion of said second set of threads being closer to said first set of threads than said start portion of said second set of threads,
said second set of threads from its start portion, winding around said member in said first direction when viewed from said second end of said member,
the diameter of said second set of threads tapering from its end portion to its start portion,
a third set of threads formed on the exterior of said member at a position spaced from said second set of threads,
said second set of threads being located between said first and third sets of threads,
said third set of threads having a start portion and an end portion spaced from said start portion,
said start portion of said third set of threads being closer to said second set of threads than said end portion of said third set of threads,
said third set of threads from its start portion winding around said member in said first direction when viewed from said first end of said member,
the diameter of said third set of threads tapering from its end portion to its start portion,
a fourth set of threads formed on the exterior of said member with said third set of threads being located between said second and fourth sets of threads,
said fourth set of threads having a start portion and an end portion spaced from said start portion,
said end portion of said fourth set of threads being closer to said third set of threads than said start portion of said fourth set of threads,
said fourth set of threads from its start portion winding around said member in said first direction when viewed from said second end of said member,
the diameter of said fourth set of threads tapering from its end portion to its start portion,
said member forming a nipple which may be severed at a position between said second and third sets of threads to form two nipples.
2. The nipple device of claim 1, wherein:
said member is formed of a plastic material which may be readily severed at a position between said second and third sets of threads to form two nipples.
3. The nipple device of claims 1 or 2, wherein:
said end portion of said first set of threads terminates in structure which extends 360° around said member in a plane generally perpendicular to the axis of said member,
said end portion of said second set of threads terminates in structure which extends 360° around said member in a plane generally perpendicular to the axis of said member,
said end portion of said third set of threads terminates in structure which extends 360° around said member in a plane generally perpendicular to the axis of said member, said end portion of said fourth set of threads terminates in structure which extends 360° around said member in a plane generally perpendicular to the axis of said member.

4. The nipple device of claim 1, comprising:
a fifth set of threads formed on the exterior of said member at a position spaced from said fourth set of threads,
said fourth set of threads being located between said third and fifth set of threads,
said fifth set of threads having a start portion and an end portion spaced from said end portion,
said start portion of said fifth set of threads being closer to said fourth set of threads than said end portion of said fifth set of threads,
said fifth set of threads from its start portion winding around said member in said first direction when viewed from said first end of said member,
the diameter of said fifth set of threads tapering from its end portions to its start portion,
a sixth set of threads formed on the exterior of said member at said second end,
said sixth set of threads having a start portion at said second end and an end portion spaced from said end portion,
said fifth set of threads being located between said fourth and sixth sets of threads,
said end portion of said sixth set of threads being closer to said fifth set of threads than said start portion of said sixth set of threads,
said sixth set of threads from its start portion winding around said member in said first direction when viewed from said second end of said member,
the diameter of said sixth set of threads tapering from its end portion to its start portion,
said member being adapted to be severed at a position between said fourth and fifth sets of threads.

5. The nipple device of claim 4, wherein:
the distance between said start portions of said first and second sets of threads is greater than the distance between said start portions of said third and fourth sets of threads,
the distance between said start portions of said third and fourth sets of threads is greater than the distance between the start portions of said fifth and sixth sets of threads.

6. The nipple device of claims 4 or 5, wherein:
said end portion of said first set of threads terminates in structure which extends 360° around said member in a plane generally perpendicular to the axis of said member,
said end portion of said second set of threads terminates in structure which extends 360° around said member in a plane generally perpendicular to the axis of said member,
said end portion of said third set of threads terminates in structure which extends 360° around said member in a plane generally perpendicular to the axes of said member,
said end portion of said fourth set of threads terminates in structure which extends 360° around said member in a plane generally perpendicular to the axis of said member,
said end portion of said fifth set of threads terminates in structure which extends 360° around said member in a plane generally perpendicular to the axis of said member,
said end portion of said sixth set of threads terminates in structure which extends 360° around said member in a plane generally perpendicular to the axis of said member.

7. The nipple device of claims 4 or 5, wherein:
said member is made of a plastic material.

8. A nipple device, comprising:
a hollow cylindrical shaped member having first and second ends,
a first set of threads formed on the exterior of said member at said first end,
said first set of threads having a start portion at said first end and an end portion spaced from said start portion,
said first set of threads from its start portion winding around said member in a first direction when viewed from said first end,
said end portion of said first set of threads terminating in structure which extends around said member in a plane generally perpendicular to the axis of said member,
a second set of threads formed on the exterior of said member at a position spaced from said first set of threads,
said second set of threads having a start portion and an end portion spaced from said start portion,
said end portion of said second set of threads being closer to said first set of threads than said start portion of said second set of threads,
said second set of threads from its start portion, winding around said member in said first direction when viewed from said second end of said member,
said end portion of said second set of threads terminating in structure which extends around said member in a plane generally perpendicular to the axis of said member,
a third set of threads formed on the exterior of said member at a position spaced from said second set of threads,
said second set of threads being located between said first and third sets of threads,
said third set of threads having a start portion and an end portion spaced from said start portion,
said start portion of said third set of threads being closer to said second set of threads than said end portion of said third set of threads,
said third set of threads from its start portion winding around said member in said first direction when viewed from said first end of said member,
said end portion of said third set of threads terminating in structure which extends around said member in a plane generally perpendicular to the axis of said member,
a fourth set of threads formed on the exterior of said member with said third set of threads being located between said second and fourth sets of threads,
said fourth set of threads having a start portion and an end portion spaced from said start portion,
said end portion of said fourth set of threads being closer to said third set of threads than said start portion of said fourth set of threads,
said fourth set of threads from its start portion winding around said member in said first direction when viewed from said second end of said member,
said end portion of said fourth set of threads terminating in structure which extends around said member in a plane generally perpendicular to the axis of said member, said member forming a nipple which may be severed at a position between said second and third sets of threads to form two nipples.

9. The nipple device of claims 1 or 8, comprising: wrench flats formed on said member between said first and second sets of threads; and
wrench flats formed on said member between said third and fourth sets of threads.

* * * * *